(12) United States Patent
Sweeney et al.

(10) Patent No.: US 10,404,737 B1
(45) Date of Patent: *Sep. 3, 2019

(54) METHOD FOR THE CONTINUOUS CALCULATION OF A CYBER SECURITY RISK INDEX

(71) Applicant: OPAQ Networks, Inc., Herndon, VA (US)

(72) Inventors: Matthew S. Sweeney, Rochester, NY (US); Benjamin B. Pokines, Rome, NY (US)

(73) Assignee: OPAQ Networks, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,632

(22) Filed: Jan. 15, 2019

Related U.S. Application Data

(63) Continuation of application No. 15/336,307, filed on Oct. 27, 2016, now Pat. No. 10,212,184.

(51) Int. Cl.
*G06F 21/00* (2013.01)
*H04L 29/06* (2006.01)
(Continued)

(52) U.S. Cl.
CPC ...... *H04L 63/1433* (2013.01); *G06F 16/2228* (2019.01); *G06F 21/552* (2013.01);
(Continued)

(58) Field of Classification Search
CPC ........ G06F 21/50; G06F 21/55; G06F 21/552; G06F 21/554; H04L 63/14;
(Continued)

(56) References Cited

U.S. PATENT DOCUMENTS 7,376,969 B1   5/2008   Njemanze et al.
8,056,130 B1   11/2011  Njemanze et al.
(Continued)

FOREIGN PATENT DOCUMENTS

KR   1020040028407   4/2004

OTHER PUBLICATIONS

International Search Report and Written Opinion dated Dec. 15, 2017, directed to International Application No. PCT/US2017/057797; 11 pages.

(Continued)

*Primary Examiner* — Edward Zee
(74) *Attorney, Agent, or Firm* — Morrison & Foerster LLP

(57) ABSTRACT

A method for assessing a cyber security risk, the method comprising the steps of: obtaining cyber security precursor information from a plurality of sources, wherein the cyber security precursor information can be obtained from one or more online or offline sources; normalizing the obtained cyber security precursor information to a common information model; generating, from the normalized cyber security precursor information, one or more events; producing, from the one or more generated events, one or more facts; calculating a plurality of risk indicators from the one or more facts; normalizing the plurality of risk indicators to a common model; calculating, using the normalized plurality of risk indicators, one or more cyber risk index component scores; and calculating, using the one or more cyber risk index component scores, a cyber risk indicator index.

32 Claims, 14 Drawing Sheets

(51) Int. Cl.
*G06F 16/22* (2019.01)
*G06F 21/55* (2013.01)

(52) U.S. Cl.
CPC ............ *G06F 21/554* (2013.01); *H04L 63/14* (2013.01); *H04L 63/1425* (2013.01)

(58) Field of Classification Search
CPC ............ H04L 63/1408; H04L 63/1416; H04L 63/1425; H04L 63/1433
See application file for complete search history.

(56) References Cited

U.S. PATENT DOCUMENTS

| | | | |
|---|---|---|---|
| 8,201,257 | B1 | 6/2012 | Andres et al. |
| 8,595,845 | B2 | 11/2013 | Basavapatna et al. |
| 8,732,837 | B1 | 5/2014 | Miller et al. |
| 8,789,192 | B2 | 7/2014 | LaBumbard |
| 8,850,571 | B2 | 9/2014 | Staniford et al. |
| 8,893,276 | B2 | 11/2014 | Sutherland et al. |
| 9,003,537 | B2 | 4/2015 | Raz et al. |
| 9,032,521 | B2 | 5/2015 | Amini et al. |
| 9,264,444 | B2 | 2/2016 | Moore et al. |
| 9,294,498 | B1 * | 3/2016 | Yampolskiy ........ H04L 63/1433 |
| 9,306,965 | B1 | 4/2016 | Grossman et al. |
| 9,317,692 | B2 | 4/2016 | Elder et al. |
| 9,401,926 | B1 | 7/2016 | Dubow et al. |
| 9,501,647 | B2 | 11/2016 | Yampolskiy et al. |
| 9,503,469 | B2 | 11/2016 | Lin |
| 2002/0147803 | A1 | 10/2002 | Dodd et al. |
| 2008/0028470 | A1 | 1/2008 | Remington et al. |
| 2009/0024663 | A1 | 1/2009 | McGovern |
| 2014/0137257 | A1 | 5/2014 | Martinez et al. |
| 2015/0381646 | A1 | 12/2015 | Lin |
| 2016/0021135 | A1 | 1/2016 | Chesla et al. |
| 2016/0080408 | A1 | 3/2016 | Coleman et al. |
| 2016/0148103 | A1 | 5/2016 | Sarrafzadeh et al. |
| 2016/0171415 | A1 | 6/2016 | Yampolskiy et al. |
| 2016/0173521 | A1 | 6/2016 | Yampolskiy et al. |

OTHER PUBLICATIONS

Jones, Rick A., and Barry Horowitz. "A System-Aware Cyber Security architecture." Systems Engineering 15.2 (2012): p. 225-240.

Sweeney et al., U.S. Office Action dated May 17, 2018, directed to U.S. Appl. No. 15/336,307; 13 pages.

Ten, Ghee-Wool, Junho Hong, and Chen-Ching Liu. "Anomaly detection for cybersecurity of the substations." IEEETransactions on Smart Grid 2.4 (2011): p. 865-873.

* cited by examiner

METHOD FOR THE CONTINUOUS CALCULATION OF A CYBER SECURITY RISK INDEX

CROSS-REFERENCE TO RELATED APPLICATIONS

This application is a continuation application of U.S. patent application Ser. No. 15/336,307, filed on Oct. 27, 2016, which is herein incorporated in its entirety by reference and for all purposes.

FIELD OF THE INVENTION

The present disclosure is directed generally to a method for providing an automated, continuous cyber security risk assessment measurement.

BACKGROUND OF THE INVENTION

Government entities, corporations, websites, and other organizations experience non-stop cyber-attacks from both domestic and foreign attackers. These attacks necessitate expensive and time-consuming protective measures and countermeasures. Despite even the best measures these constant attacks can result in data loss, confidential information breaches, and the erosion of customer confidence, and thus can significantly damage the reputation and financial footing of an entity. Businesses are adopting processes and implementing procedures designed to monitor their cyber health in near real time in order to determine the security posture of the company compared to peers and/or other businesses around the globe.

Accordingly, there is a continued need in the art for methods and systems for continuously measuring cyber security risk indicators.

SUMMARY OF THE INVENTION

The present disclosure is directed to an inventive method for providing an automated, continuous cyber security risk assessment measurement. Various embodiments and implementations herein are directed to a method for consistent, predictable, repeatable measurement and comparison of cyber security risk indicators. Various embodiments include methods for consistent measurement and comparison of cyber security risks present in one organization over time, as well as between two or more organizations.

For example, in some embodiments, the method comprises generation of a continuous cyber security risk assessment measurement, a "cyber risk indicator score," based on a variety of inputs including but not limited to data volume, network infrastructure and security device activity, defense sensor and host endpoint behavior, risks associated with connections to external entities, newly observed threat activities, audit event data quality, network and host-based threat detection sensors, vulnerability scanners, and/or asset management systems, and personnel security risk indicator systems and reports, among other factors. According to an embodiment, the continuous cyber security risk assessment measurement can also comprise a personnel and/or insider threat risk component, among other possible factors. The various inputs can be weighed and the cyber risk indicator score can be computed for the given network or group of networks (enterprise). Further, the score can be constantly updated and revised as new information is obtained.

Using multiple inputs as described or otherwise envisioned herein provides several unique capabilities to the cyber security risk assessment system and method described herein. For example, there is unified reporting of operational risk due to information technology activities, and there is consistent measurement of the security value provided by data sources and/or sensors in the operational environment based on their impact upon security risk. In addition, there can be prioritization of security event remediation activities based on risk priority.

In some embodiments, the method may be used for: (i) cyber security risk indicator analysis using internal data sources, from an internal perspective; and/or (ii) cyber security risk indicator analysis using external data sources, from an external perspective. More generally, applications include corporate ranking for cyber insurance, regulatory compliance reporting, and/or general analysis of trends in threats and vulnerabilities on a global scale.

In accordance with an aspect is a method for calculating a cyber security risk. The method includes the steps of: (i) obtaining cyber security precursor information from a plurality of sources, wherein the cyber security precursor information can be obtained from one or more online or offline sources; (ii) normalizing the obtained cyber security precursor information to a common information model; (iii) generating, from the normalized cyber security precursor information, one or more events; (iv) producing, from the one or more generated events, one or more facts; (v) calculating a plurality of risk indicators from the one or more facts; (vi) normalizing the plurality of risk indicators to a common model; (vii) calculating, using the normalized plurality of risk indicators, one or more cyber risk index component scores; and (viii) calculating, using the one or more cyber risk index component scores, a cyber risk indicator index.

According to an embodiment, the method further includes the step of storing the generated one or more events in an event database. According to an embodiment, the method further includes the step of storing the generated one or more facts in a fact database. According to an embodiment, the method further includes the step of storing the generated one or more risk indicators in a risk indicator database.

According to an embodiment, the step of producing one or more facts comprises one or more of a mathematical analysis, pattern detection, anomaly detection, and rule-based assessment of the one or more events According to an embodiment, the step of calculating a plurality of risk indicators from the one or more facts comprises an analysis of several facts over time.

According to an embodiment, the cyber risk indicator index comprises a score between 0 and 100.

According to an embodiment, the method further includes the step of providing the cyber risk indicator index to a user.

According to an embodiment, the step of providing the cyber risk indicator index to a user comprises a user interface.

According to an embodiment, the user interface comprises a graph of cyber risk indicator index over time.

According to an embodiment, the method further includes the step of comparing the cyber risk indicator index to a pre-determined threshold.

According to an embodiment, the method further includes the step of notifying a user if the cyber risk indicator index exceeds the pre-determined threshold.

According to an embodiment, the method further includes the step of initiating an automated action if the cyber risk indicator index exceeds the pre-determined threshold.

According to an aspect is a computerized system for determining a cyber security risk. The system includes: a plurality of sensors configured to obtain cyber security precursor information; an event database configured to store one or more events; a fact database configured to store one or more facts; and a processor programmed to perform the steps of: (i) receiving the cyber security precursor information from the plurality of sensors; (ii) normalizing the obtained cyber security precursor information to a common information model; (iii) generating, from the normalized cyber security precursor information, one or more events; (iv) storing the generated one or more events in the event database; (v) producing, from the one or more generated events, one or more facts; (vi) storing the one or more facts in the facts database; (vii) calculating a plurality of risk indicators from the one or more facts; (viii) normalizing the plurality of risk indicators to a common model; (ix) calculating, using the normalized plurality of risk indicators, one or more cyber risk index component scores; and (x) calculating, using the one or more cyber risk index component scores, a cyber risk indicator index.

According to an aspect is a computer system for determining a cyber security risk. The system includes: a non-transitory computer-readable storage medium configured to store data collected by the computer system and comprising computer-executable instructions; and a processor programmed to execute the computer-executable instructions resulting in the computer system performing the steps of: receiving cyber security precursor information from a plurality of sensors; (ii) normalizing the obtained cyber security precursor information to a common information model; (iii) generating, from the normalized cyber security precursor information, one or more events; (iv) storing the generated one or more events in the non-transitory computer-readable storage medium; (v) producing, from the one or more generated events, one or more facts; (vi) storing the one or more facts in the non-transitory computer-readable storage medium; (vii) calculating a plurality of risk indicators from the one or more facts; (viii) normalizing the plurality of risk indicators to a common model; (ix) calculating, using the normalized plurality of risk indicators, one or more cyber risk index component scores; and (x) calculating, using the one or more cyber risk index component scores, a cyber risk indicator index.

These and other aspects of the invention will be apparent from the embodiments described herein.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

The present disclosure describes various embodiments of a system and method for providing an automated, continuous cyber security risk assessment measurement that provides a normalized comparison between distinct sets of data collected from a variety of sources, including both offline and online data sources. Offline data sources may include but not be limited to personnel security indicators, localized and global cyber threat and risk indicators, and overall threat and risk levels calculated for a specific industry or the Internet as a whole. Online data sources may include but not be limited to computer network asset inventories, scan results from vulnerability scanning and penetration testing activities, and the output of security and architecture data from networked computing and security devices. Applicants have recognized and appreciated that it would be beneficial to provide a cyber security risk indicator assessment measurement that can be updated automatically and continuously as new information is received and/or analyzed.

Figure 1A:
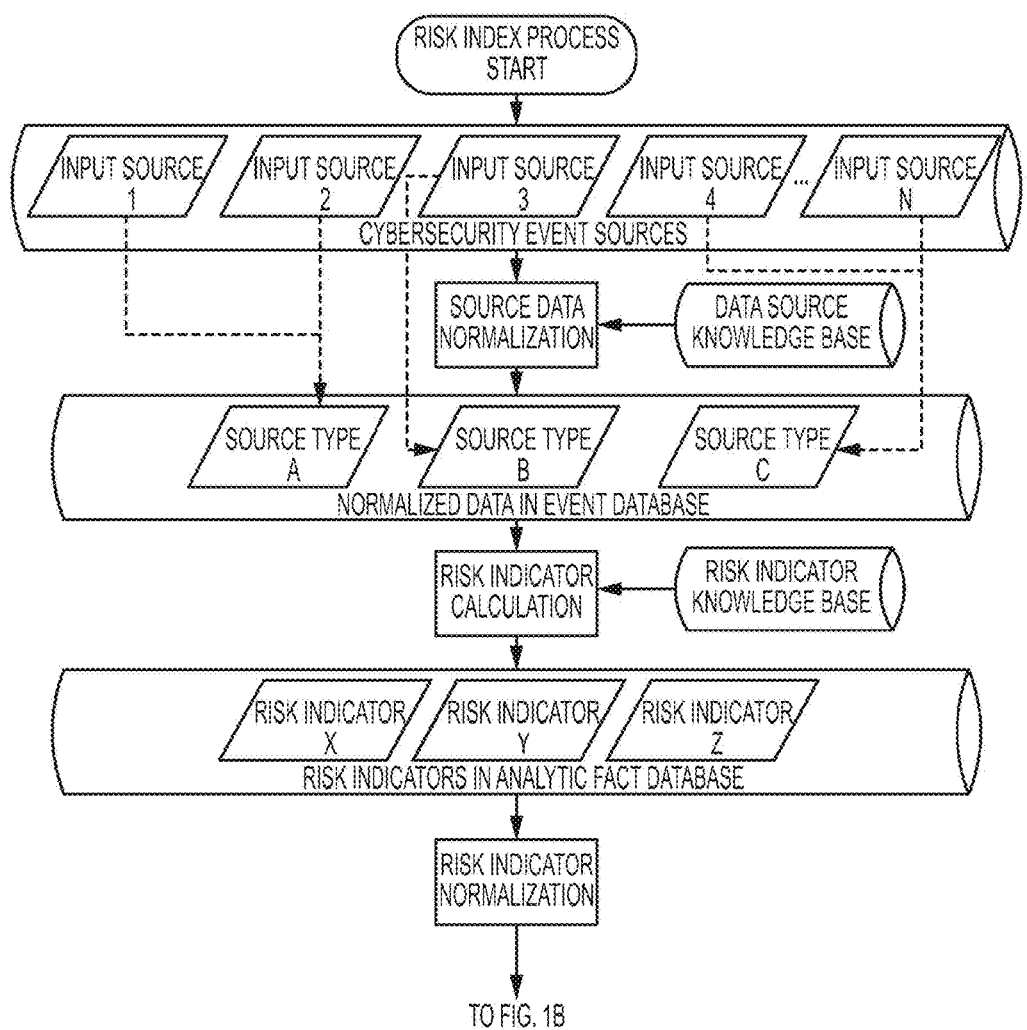
FIG. 1A is a flowchart of a cybersecurity index calculation method, in accordance with an embodiment.
Figure 1B:
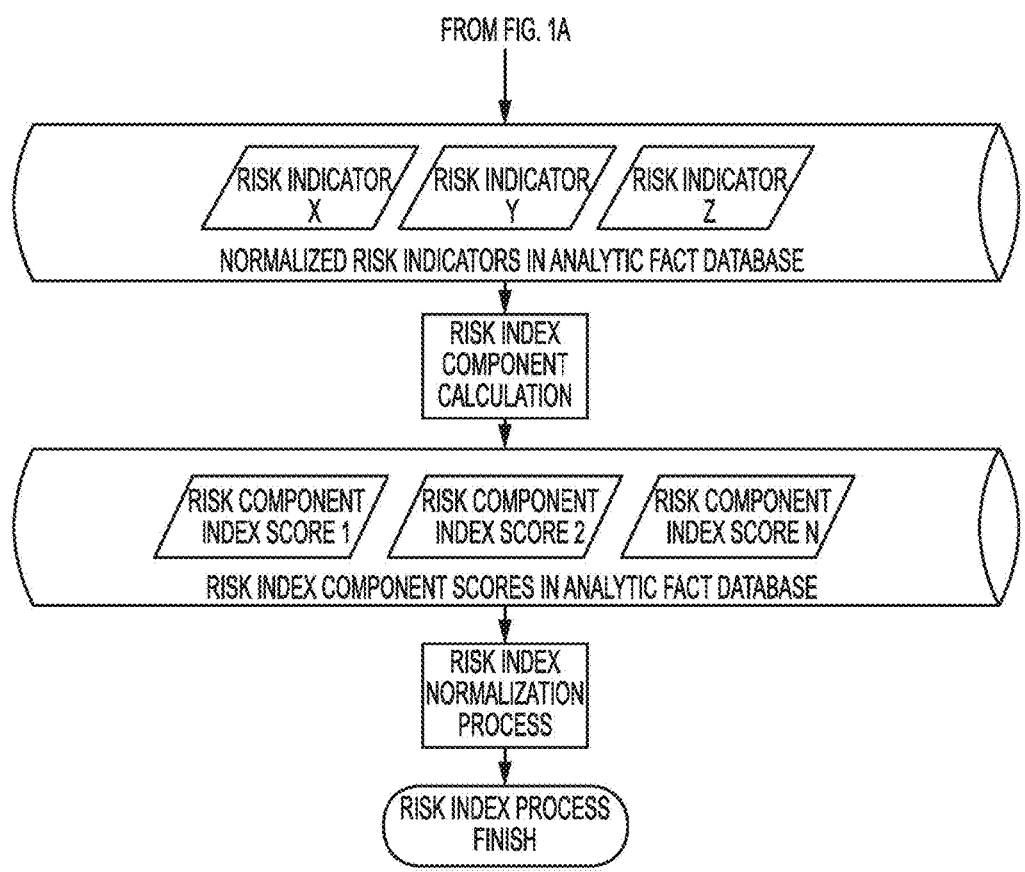
FIG. 1B is a flowchart of a cybersecurity index calculation method, in accordance with an embodiment.

Referring to FIG. 1 is a flowchart of a cybersecurity index calculation method, in accordance with an embodiment. According to an embodiment, data from a plurality of sources is collected and processed into a uniform format. The data is then analyzed, which can include one or more of the following steps: (i) ingesting the data into a data transformation and normalization process; (ii) producing one or more normalized events from the data; (iii) producing one or more facts from the data; (iii) producing one or more metrics from the produced facts; (iv) utilizing the metric facts to generate risk indicators; (v) normalizing the risk indicators, including by such methods as sensor type, logical location on a computer network, physical location, and/or geographic location; (vi) computing a component score for risk indicators, represented by a ratio of that score per sensor type; (vii) producing the total risk index component score; (viii) normalizing the risk index component score based on the configured contribution of that score to the overall index; (ix) adjusting the index component score by a normalization coefficient; and/or (x) combining all component scores into an overall "cyber score" or measurement of the system's cyber security risk assessment. The risk assessment and metrics are then optionally output to a user through a user interface. The risk assessment and metrics can also optionally be utilized within an automated system to respond to a risk, where the response is based, at least in part, on the calculated risk assessment and/or one or more of the risk metrics.

Figure 2A:
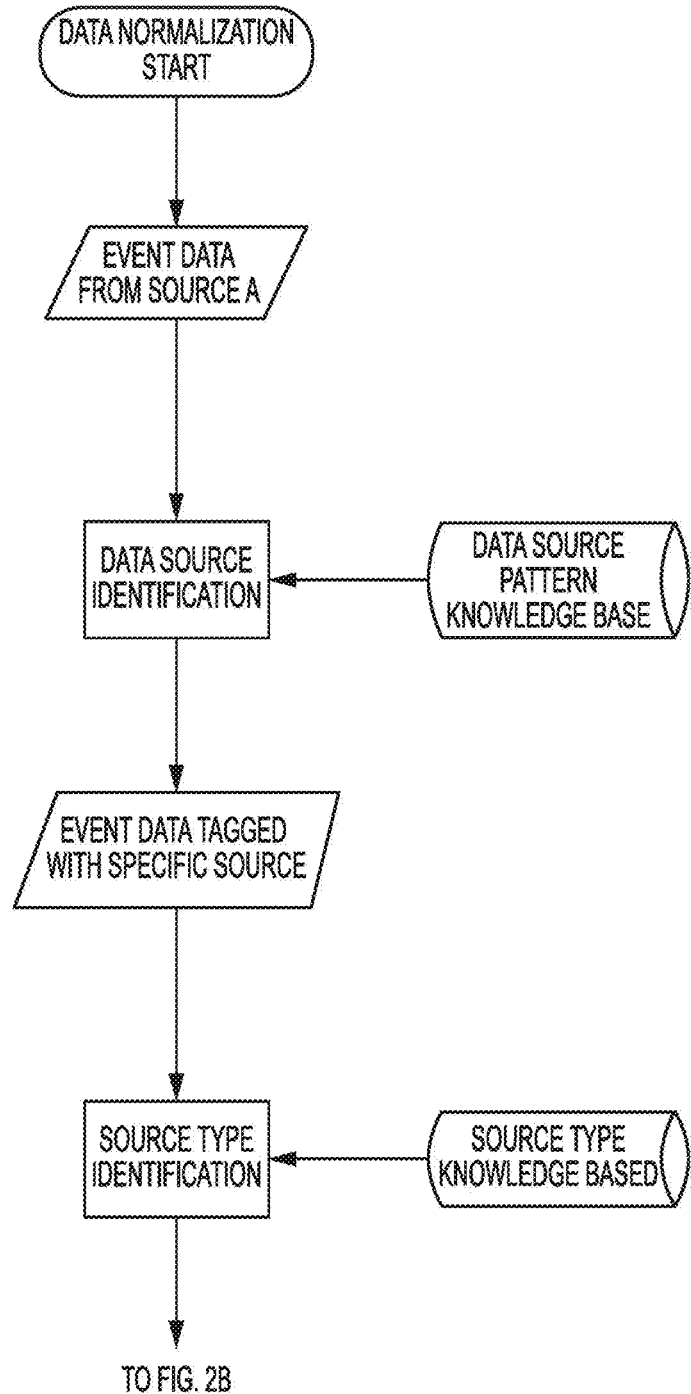
FIG. 2A is a flowchart of a cybersecurity data source normalization method, in accordance with an embodiment.
Figure 2B:
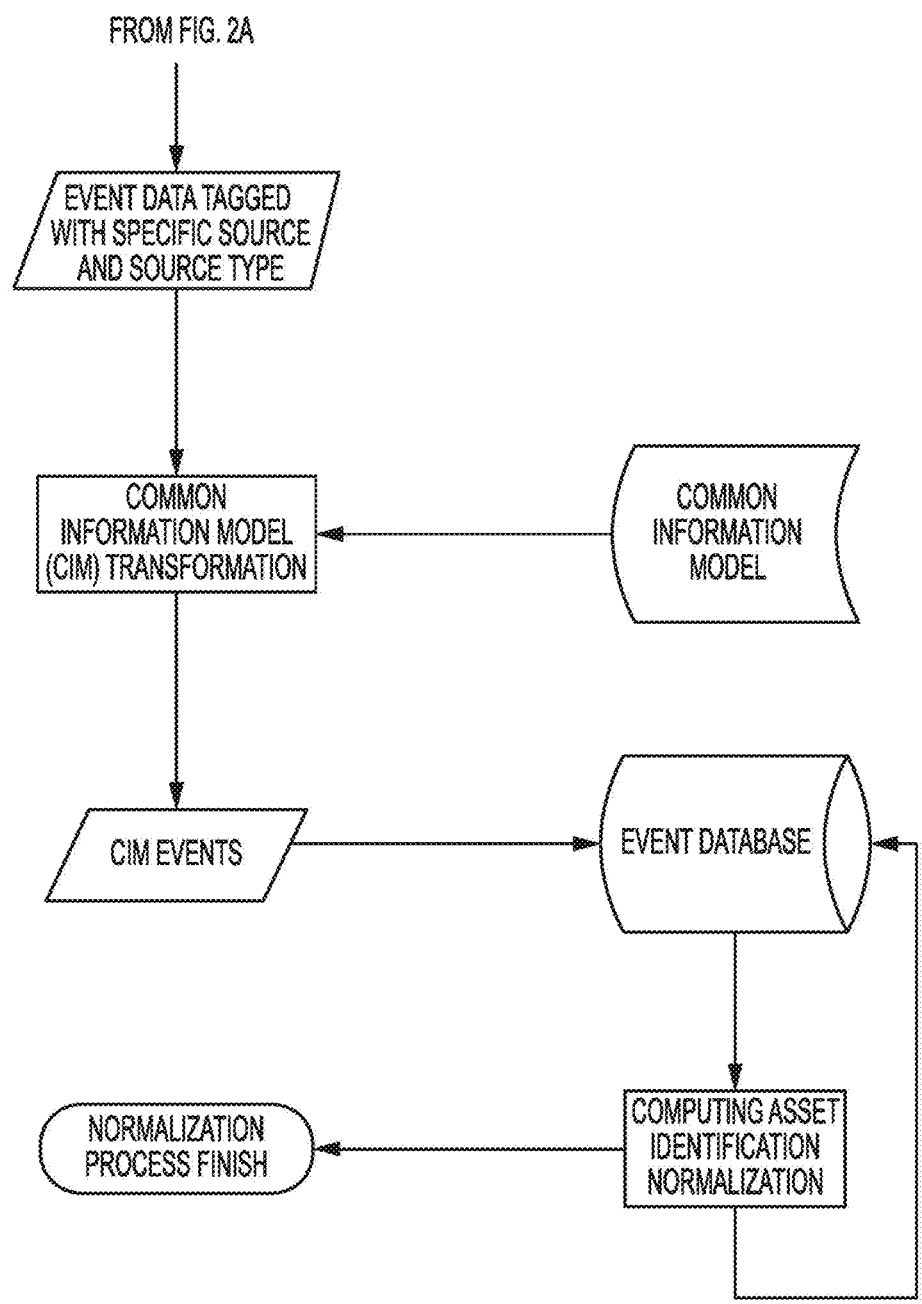
FIG. 2B is a flowchart of a cybersecurity data source normalization method, in accordance with an embodiment.

Referring to FIG. 2 is a flowchart of a source data normalization method, in accordance with an embodiment.

According to an embodiment, the data sources that are processed as part of the risk index calculation are normalized to a common information model. An integral part of computing the overall risk index is the ability to normalize the index. Normalization of the index occurs using one or more of the following primary factors: source type, asset identification, risk indicator properties (data bounds detected for properties based on the common information model), and risk index component contribution.

According to one embodiment, source data normalization comprises the following main steps: (1) identify the data source categories, aligning it with a standard taxonomy of data sources and assigning a primary and (optionally) a secondary type; (2) create a normalization function for the severity values produced by the data source, which transforms data from source format into a normalized scale of 0-3 severity per data source, although many other scales are possible; and (3) assign a weight to each data source category, which applies regardless of the data source vendor. These initial steps produce a normalized event that captures activity relative to categories of data sources such as antivirus (AV), network intrusion protection system (NIPS), and network firewall, among many other possible categories of data sources.

As the continuous risk assessment process collects reported events from cyber security monitoring and defense systems, a normalization function is applied to ensure that all events can be compared equally regardless of a vendor-specific representation of certain fields such as severity or event importance, data source, website reputation, or threat types. According to an embodiment, the transformation function can be calculated as follows:

$$\text{TransformEvent}(e) = \text{Combine}(\text{TransformEvent}(e), \text{NormalizeEventValues}(e)) \quad \text{(Eq 1.)}$$

For each sensor, the "TransformEvent" function is a data source (sensor) defined operation which applies a data transformation to a raw event to produce one or more entities in the common information model. The "NormalizeEvent" function returns a tuple that contains an original event attribute and a corresponding normalized attribute which, for instance, in the case of threat or vulnerability severity transforms a number (whole or floating point) and returns an attribute in the form of a whole number between 0 and 3 inclusive. The "Combine" function ensures that for any of the entities generated by "TransformEvent" each are assigned any attributes returned by the "NormalizeEventValue function. As an example, given an original event expressed as a tuple of values (a,b,c), the value c might be transformed into a new value c', which would then be applied in the "Combine" function to return a new tuple (a, b, c') as the normalized event value.

In order to complete the general data source normalization process, a sensor weight is calculated to determine how points shall be allotted to each sensor. The percent of weight allocated per sensor is proportional to the percentage of network assets on which that particular sensor can observe and report on event activity and the operational impact on the assets involved in those events, which is expressed as follows:

$$\text{ScoreWeight}(\text{sensor},\text{assets}) = \text{OperationalImpact}(\text{assets}) \times \text{AssetCoverage}(\text{sensor}) \quad \text{(Eq. 2)}$$

A user-defined ranking on the operational impact of asset loss (from a confidentiality, integrity, and/or availability perspective, for example) is applied by the "OperationalImpact" function. The ability of a sensor to monitor and report on some portion of an organization's networked assets is returned by "AssetCoverage," which is a percentage and can be defined as a value between 0 and 1, inclusive. According to an embodiment the base weight for each sensor type is 1, which is equivalent to 100% and results in full allocation of sensor points. The "ScoreWeight" function modifies the base score for each sensor with a percentage that is expressed as a value between 0 and 1, inclusive.

According to an embodiment, after applying the data source normalization process, the general process for creating another indicator score that contributes to the overall cyber security risk indicator index is as follows:

$$\text{IndexComponentPoints} = \text{AvailablePoints} - [\Sigma(\text{sensorPoints} * \text{sensorWeight}) * \text{AvailablePoints}] \quad \text{(Eq. 3)}$$

According to an embodiment, data source normalization comprises taking a source audit record (such as an event in a log) and making a determination as to a type of source information for which this data matches a given pattern. Patterns are defined for matching data according to a heuristic process wherein a set of regular expression (non-deterministic finite state automata) collections, where each collection of regular expressions is applied to a record and the best fit for a given pattern is determined by the quality of match. The factors influencing matching quality include a score of whether a pattern match does not occur, occurs in part, or is satisfied for each input record. A fit score for patterns is defined using schemes such as rule-based matches (perfect fit), classification score based on Bayesian probability, confusion matrices, and other mechanisms for entity classification available to those with skill in the art.

Figure 3:
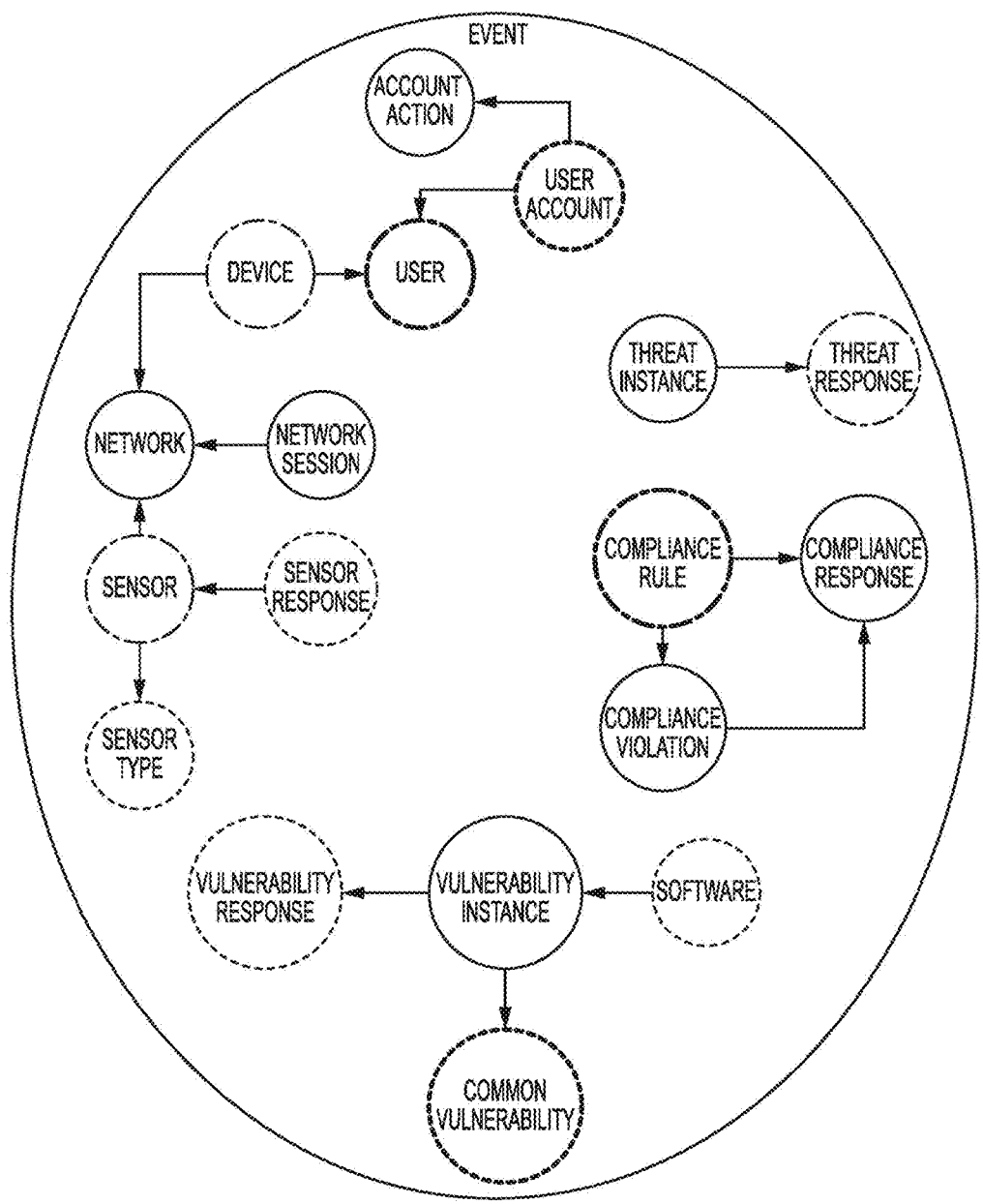
FIG. 3 is a Venn diagram of various possible components of an event data model, in accordance with an embodiment.

After the pattern is identified to a given source type, the source type knowledge base is queried to determine the root source type for that data. After the categorization is complete, the data is transformed into a format that can be processed by the analytic engine, called an event. According to an embodiment, the Event data model described or otherwise envisioned herein is part of a common information model (CIM) that is used to represent the data in the domain being analyzed. The Event format contains a timestamp for pedigree, a set of attributes for the semantic property being represented, and also includes a set of graph-like relationships between Events using node and edge representations. Events can be represented in a tree-based text or binary format. The system also has the ability to transform existing data formats to include XML Schema Documents (XSD), Eclipse Modeling Format (EMF) Unified Modeling Language (UML) format, and JavaScript Object Notation (JSON), automatically enabling any data model defined in those formats to be incorporated into the CIM. FIG. 3 is a Venn diagram of various possible components of an Event data model or module, in accordance with an embodiment. Although FIG. 3 illustrates a number of possible entities that could be part of the Event module or data model, it should be noted that many other components or entities are possible.

As data is transformed into the common information model, the attributes used for unique identification of a computing asset can be stored in a database. As events are processed, this identifying information is normalized so that events associated with different logical network MAC (Media Access Control) addresses or IP (Internet Protocol) addresses are all associated with the correct physical asset. According to an embodiment, the events produced by the source data normalization method are stored in an event database.

According to an embodiment, analytic facts are computed using the normalized Event database created by the source data normalization method, and based on the application of mathematical functions, pattern detection, anomaly detection, and rule-based assessment of the event data. The analytic facts represent an assessment of events, facts, and/or a combination thereof. Examples of methods of deriving facts include, but are not limited to: (i) metrics in the form of: minimum, maximum, average, moving average, median, mode, and/or standard deviation, among others; (ii) mathematical functions in the form of: count, sum, trend (such as increasing, decreasing, or constant), rate (such as time between events, the rate of x per an object y, the slope (being the rate of change over time)), and/or duration (such as between events x and y, or event types a and b, or the time from detection of threat to containment or remediation of that threat data confidence, such as percent of errors in the data), among others. Each fact includes a context that is a reference to the set of events and/or facts that contributed to the value represented by the fact.

Figure 4:
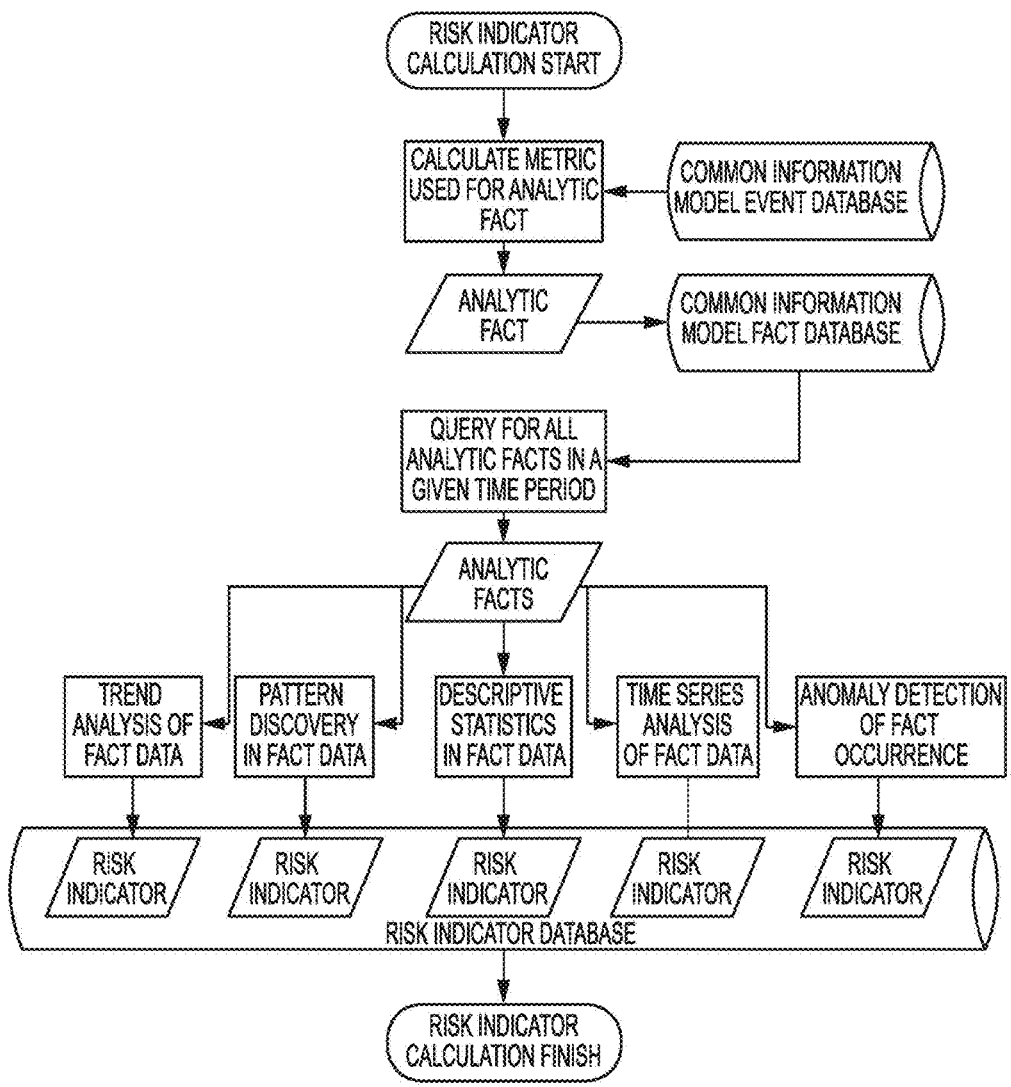
FIG. 4 is a flowchart of a cyber risk indicator calculation method, in accordance with an embodiment.

Referring to FIG. 4 is a flowchart of a method for risk indicator computation, in accordance with an embodiment. Risk indicators can be computed from facts. According to an embodiment, risk indicators are computed by, for example, applying a global and/or time-series analysis of fact and event data in order to derive the indicator. Combining facts into risk indicators can make use of any function, and the following are just a few examples:

Facts of type X over all time;
Facts of type X over a particular window of time (between t1 and t2, including whether inclusive or exclusive);
Facts of a metric type, m, incorporating values within a certain threshold on a fact attribute;
Facts compared to another point (t_m) or window (t_l–t_n) in time (for instance, how does this value compare to value at the same time last week, same day last year, or to all days);
Normalized instances of facts with respect to (w.r.t) a certain variable, y;
New instances of fact X since time t;
Facts of metric type X with condition Y;
Statistical outlier detection of Facts using (mean+(2*std_dev)) (focuses on data top 95.4% of activity); and
Statistical outlier detection of facts using normal (IQR+1.5*std_dev) or extreme outlier (IQR+3.0*std_dev) calculation.

According to an embodiment, once risk indicators are calculated, they can be stored in an analytic fact database for normalization processing.

Figure 5:
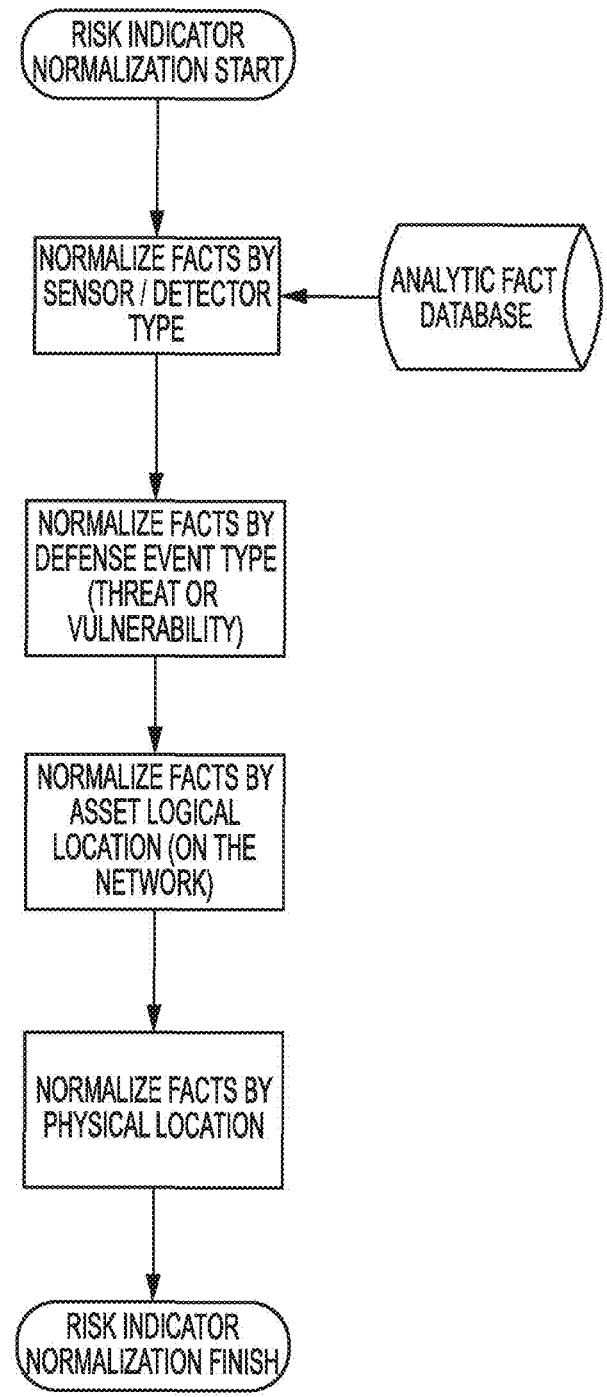
FIG. 5 is a flowchart of a cyber risk indicator normalization method, in accordance with an embodiment.

Referring to FIG. 5 is a flowchart of a method for risk indicator normalization, in accordance with an embodiment. In order to provide a cybersecurity risk index score that is comparable between two distinct sets of networked computing assets, such as departments within an organization or organizations of different sizes, normalization of the risk indicators can be an important step in the index calculation process. The method for normalization may be performed on variables that are shared across events and analytic facts, for example in the current embodiment they take the form of normalization by the sensor type that recorded the event, threat type, defense action type, vulnerability type, logical location (i.e., network assignment) or physical location.

Figure 6:
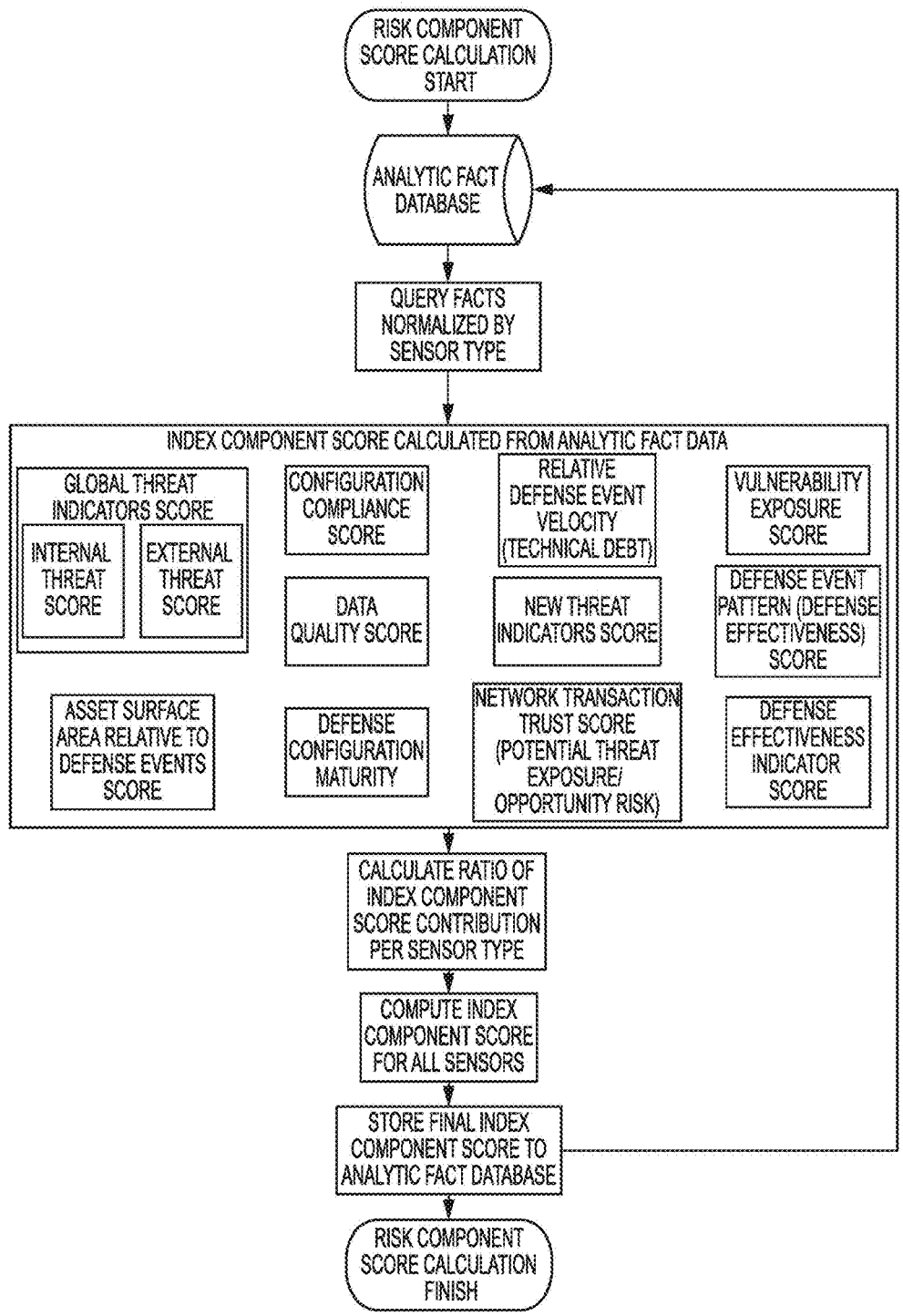
FIG. 6 is a flowchart of a cyber risk index component score calculation method, in accordance with an embodiment.

Referring to FIG. 6 is a flowchart of a method for cyber risk index component score calculation, in accordance with an embodiment. Risk indicators are used to calculate the risk index component scores. Analytic facts for risk indicators that are normalized by sensor type are used to compute a set of risk index component scores, the set containing one set per sensor type that for which event data is available.

The cyber risk index component scores may include the following factors, for example: Global Threat Indicators Score; Internal Threat Indicators Score; External Threat Indicators Score; Configuration Compliance Score; Data Quality Score; New Threat Indicators Score; Relative Defense Event Velocity (Technical Debt); Vulnerability Exposure Score; Asset Surface Area (Surface Area); Network Transaction Trust Score (Opportunity Risk); and/or Defense Configuration Maturity (Length of Score History), among many others. According to an embodiment, the cyber risk index component score may factor the one or more factors using the following equation:

$$\text{IndexPts} = \Sigma(\text{SubIndexScore} * \text{weight}) \tag{Eq. 4}$$

Each index component score is calculated by using the set of index component score per sensor type to calculate a ratio of the contribution per sensor type to that score by multiplying the index component score per sensor by an index component score weighting function. The resulting weighted scores are averaged and produce the score for index component representing the result of analyzing event data from all sensors. According to an embodiment, risk indicators and component index scores may be of a time-series analysis nature, calculating values over 'historical' periods and comparing values to current time windows. Time windows are configurable and many combinations of time periods are possible. After processing, each index score can be tagged with its type and stored in the analytic fact database.

According to an embodiment, the "Defense Effectiveness" index component score measures indicators of repetitious defense events on a networked computing asset, potentially indicating compromise by an attack. The "Technical Debt" index component score is the proportion of total detection activity (vulnerabilities, threats) relative to the number of assets (given the percent of the network scanned) and comparing this proportion to those of the recent past. It is meant to tell the user how much debt they have incurred where debt is expressed in terms of security issues (as opposed to owed capital). The "Opportunity Risk" index component score represents how the severity of current detections compares to the maximum severity that could be seen. The "Detections from New Threats" index component score tells a user how many of their current threats are 'new', where new refers to a threat that has not been seen on the network over the past N time periods, depending upon the time window being analyzed. The "Surface Area" index component score measures how many of the network assets currently have threat detections. The "Audit Data Quality" index component score calculates the quality of data input, availability, and breadth of sensor contributions to the audit data over the past N days. For each day of history, this metric calculates rates of activity from each sensor as compared to similar day of week, day of year, and whether it is a weekend day or weekday. If a sensor has reported activity for that day, the data is analyzed for patterns of potentially missing data based on historical rates of data production.

According to an embodiment, the equations below represent one possible method for calculating the risk index component scores, in accordance with one possible embodiment of the invention. The following definitions of sets and terms apply to the subsequent equations for calculating the risk index component scores:

$e \in \text{Events} \rightarrow e$ is an atomic computation action detected by network and host level monitoring data sources $Events_{current} = \forall e$ within past time period between $t_0$ and $t_{-1}$ $Events_{historical} = \forall e$ within past time period $t_{-1}$ to $t_{-n}$ $\tau \in$ Threats and Threats $\subseteq$ Events $Threats_{current} = \forall \tau$ within past time period $t_0$ and $t_{-n}$ $Threats_{historical} = \forall \tau$ within past time period $t_{-1}$ and $t_{-n}$ $a \in$ Assets $\rightarrow$ a is a device operating on a given network being monitored for e $Assets_{current} = \forall a$ with activity within the past time period $t_0$ to $t_{-1}$ $Assets_{historical} = \forall a$ with event activity within the past time period $t_{-1}$ to $t_{-n}$ $s \in$ Sensors where s produces $\exists e$ The following equations represent one possible method for specific index score calculations, in accordance with one possible embodiment of the invention, and utilize the definitions of sets and terms provided above:

$$DefenseEffectiveness = \left[ \frac{RepetitionDetected(Events, t_i)}{|Assets|} \right] \quad \text{(Eq. 5)}$$

$$TechnicalDebt = \left[ \frac{\left(\frac{|Events_{current}|}{|Assets_{current}| * Duration(t_{-1}, t_0)}\right) *}{\left(\frac{|Assets_{current}|}{|Assets_{historical}|}\right)} = \frac{\left(\frac{|Events_{historical}|}{|Assets_{historical}| * Duration(t_{-n}, t_{-1})}\right) *}{\left(\frac{|Assets_{historical}|}{|Assets_{historical}|}\right)} \right] \quad \text{(Eq. 6)}$$

$$\left[ \frac{\left(\frac{|Events_{current}|}{|Assets_{historical}| * Duration(t_{-1}, t_0)}\right)}{\left(\frac{|Events_{historical}|}{|Assets_{historical}| * Duration(t_{-n}, t_{-1})}\right)} \right]$$

$$NewThreats = \left(\frac{|Threats_{current}|}{|Threats|}\right) \quad \text{(Eq. 7)}$$

$$OpportunityRisk = \frac{\sum_{\forall e} Severity(e)}{\sum_{\forall e} MaxPossibleSeverity(e) * |Events|} \quad \text{(Eq. 8)}$$

$u \in U$ where $U \subseteq$ Assets and there exists $\exists \tau \in$ Threats and OccurredOn($\tau$, u)

$$SurfaceArea = \frac{|U|}{|Assets|} \quad \text{(Eq. 9)}$$

$$ScoreHistory = \frac{\sum_{\forall e} Duration(t_i, t_j)|events|}{(j-i) * |Sensors|} \quad \text{(Eq. 10)}$$

The score history involves time periods between $t_i$ and $t_j$, where the difference between i and j represents the number of time interval.

Figure 7:
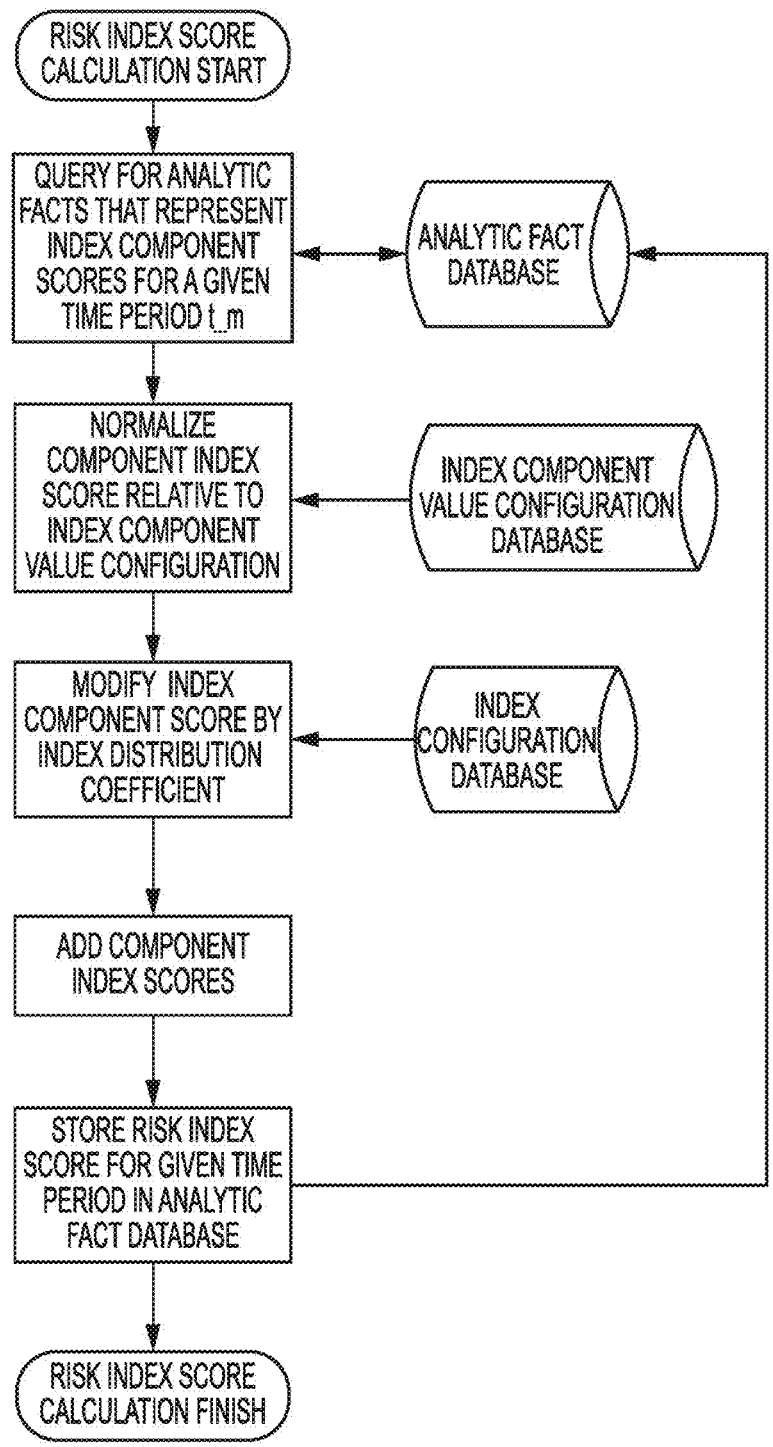
FIG. 7 is a flowchart of a cyber risk index calculation method, in accordance with an embodiment.

Referring to FIG. 7 is a flowchart of a method for cyber risk indicator index overall score calculation, in accordance with an embodiment. In order to compute the cyber risk indicator index score, the values for all component risk scores for a choose time period of analysis are retrieved from the analytic fact database. Once retrieved, each component score is normalized relative to the number of points allocated to that component index per the system configuration. Subsequently, another operation to create the appropriate score distribution is applied via a configurable function for the score coefficient. Next, all of the scores are added and the sum is returned as the cyber risk indicator index score.

The cyber risk indicator index score can then optionally be reported to a user and/or a user interface. According to one embodiment, the determined cyber risk indicator index score may be reported as a number or other format to a user through a user interface, or can be communicated to the user via a wired and/or wireless communications network. For example, the score may be communicated as a report, an email, a text message, a haptic indicator, a visual indicator, and/or an audible indicator, or any of a wide variety of other indications or communications. As another example, the score can be compared or normalized to a reporting mechanism such as a constant display or other user interface. When the score is below a predetermined threshold, the display reports the information, such as by displaying the color green. When the score exceeds a predetermined threshold, the display reports the information to the user, such as by displaying the color red. Many other display and/or notification systems and methods are possible.

Alternatively or in addition to reporting the cyber risk indicator index score to a user, the system can be designed or configured to automatically process the cyber risk indicator index score in order to perform an Information Technology orchestration automation, implement an additional compliance rule, adapt the acceptable risk index score thresholds, or automatically produce alerts of risk rule violations via e-mail, text, or perform any other action as necessary. For example, according to an embodiment the system can take one or more preprogrammed preventative actions based on the score, such as inactivating a system or sub-system, blocking and/or inactivating a communications network, changing or deleting permissions, or any of a wide variety of other actions.

Figure 8:
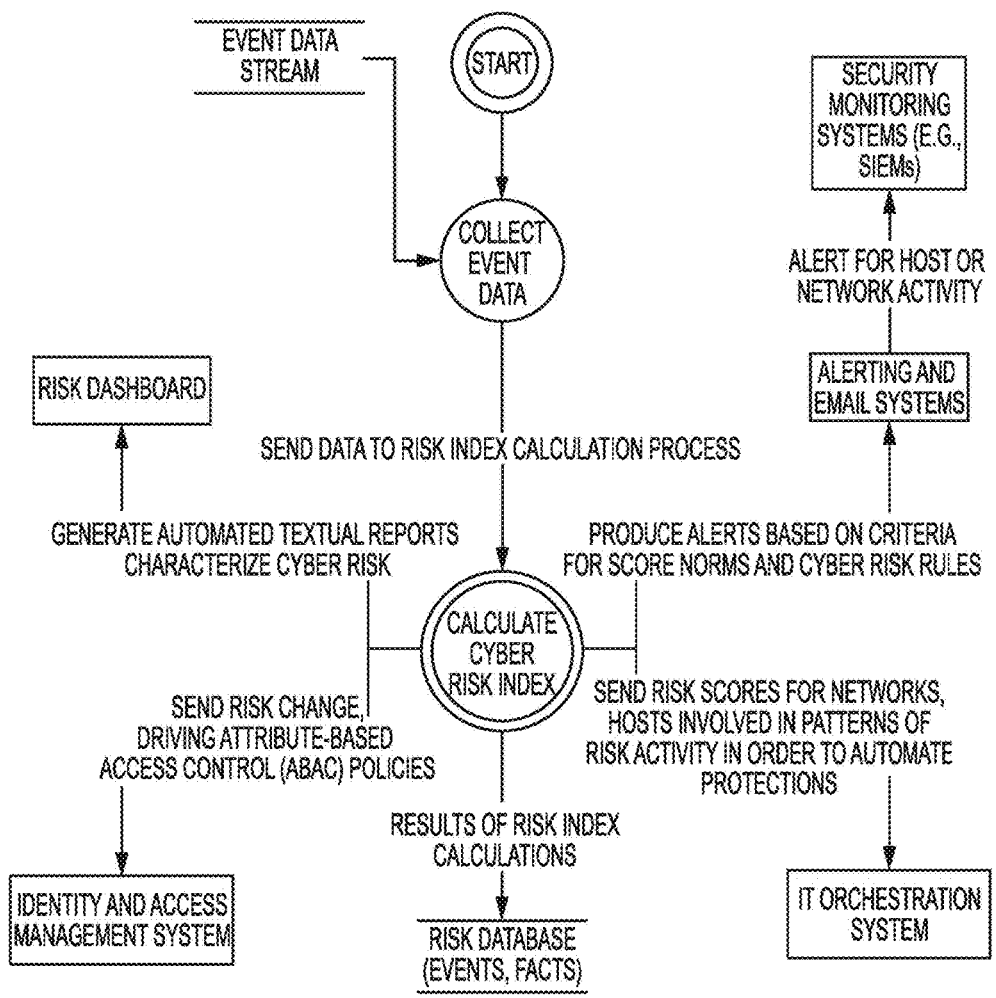
FIG. 8 is a flowchart of scenarios in which the continuous cyber risk index

An example operational scenario of an automated response triggered is depicted in FIG. 8. The continuously updated cyber risk score enables an automated response mechanism for IT operations orchestration and automation, risk alerting, risk reporting, and Identity and Access Management (IAM) adaptation, among other possible outcomes as described or otherwise envisioned herein. As one example, in an IT operations orchestration scenario, the risk results include a score for particular network segments (e.g., 10.1.x.x/16) and gives that system a means of prioritizing changes to IT infrastructure and increasing or decreasing protections as needed. For example, if the risk is measured to be low across an organization, then certain IT policies can be triggered which reduce firewall port restrictions on certain segments of the network. If the risk is measured to be high, then additional virtual firewalls and network intrusion prevention system rules may be put into place. In the risk alerting scenario, the alerts become a feedback loop for products like Security Information Event Management (SIEM) systems which can use scores for network segments to prioritize certain alerts. The alerting function can also be used as a type of IT security or operations alert to employees. The Risk Reporting scenario involves producing an automated scorecard and textual risk report that includes a scorecard of IT risk indicator status as well as depictions of the causes of the score improving or worsening, including such items as the patterns and volatility of the risk indicator scores, causes of gaps in the scores, and a prioritize list of contributors to loss of score points due to certain types of events, activity by network segments, geographically-focused activity to include natural disasters, and sensors producing abnormal event volumes.

Figure 9:
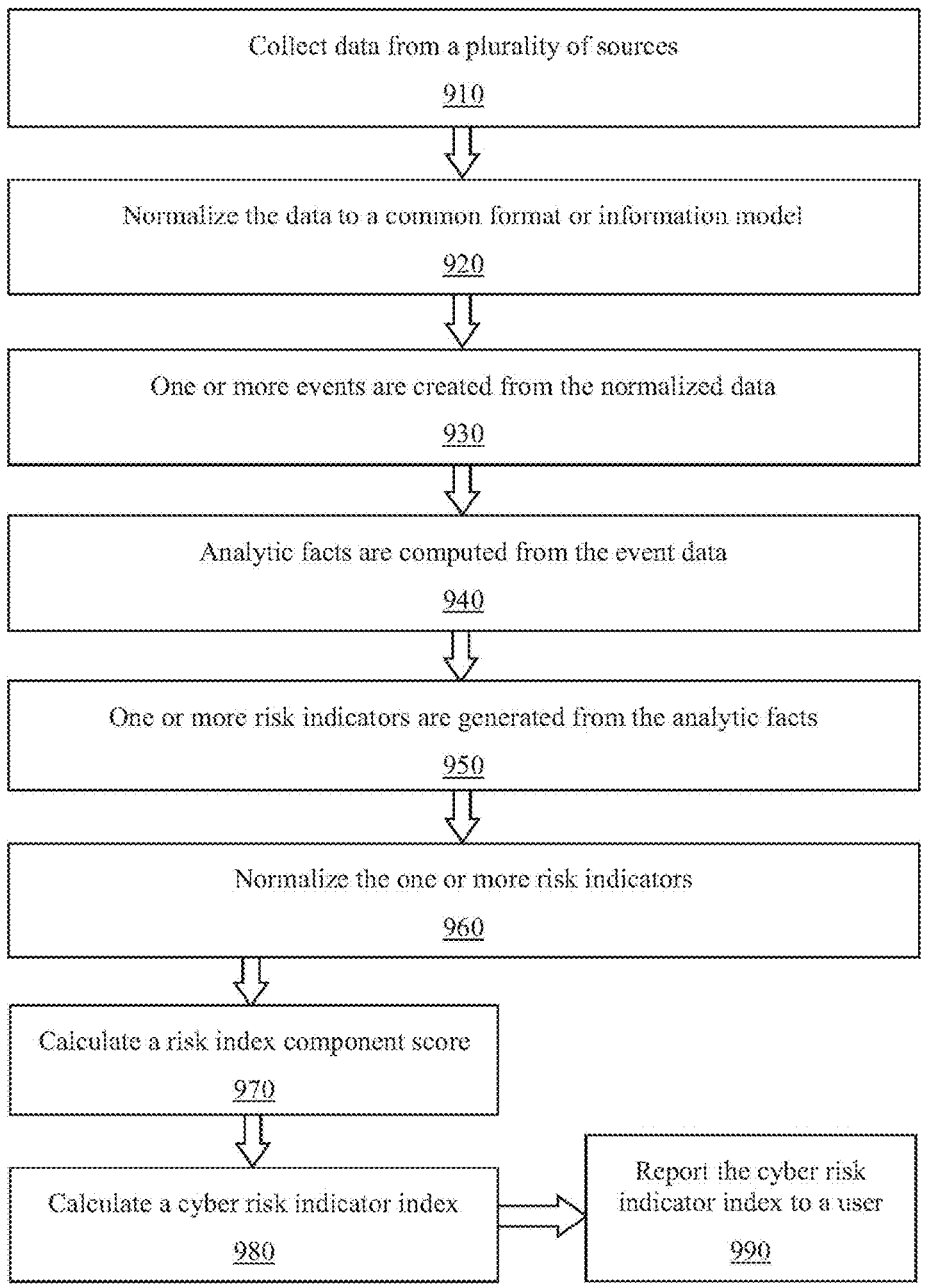
FIG. 9 is a flowchart of a method for the determination of a cyber risk index, in accordance with an embodiment.

Referring to FIG. 9, in one embodiment, is a flowchart of a method for cyber security risk analysis. According to an embodiment, the method described in FIG. 9 is utilized to generate a cybersecurity score for the network or networks under assessment, optionally on a continuous basis.

At step 910 of the method, data from various sources is collected and processed into a uniform format. For example, the system can utilize many different inputs, including but not limited to network firewalls, proxies, intrusion detection and prevention systems (IDS/IPS), asset management systems, vulnerability scanners, threat intelligence data, host-based security protection agents, security information event management systems, and other sensors related to cybersecurity monitoring and protection. These inputs produce data related to network infrastructure and device activity, defense sensor and host endpoint behavior, externally bound network activity, data and activity volume, malware detections and observed threats (including repeated threats), and asset configuration state, among other things.

At step 920 of the method, the data collected by the system from various different sensors, inputs, databases, and/or other sources is processed into a uniform format. Accordingly, the data undergoes a transformation and normalization process. According to an embodiment, in order to assess the importance of input data, it is first normalized to a discrete sensor type such as Firewall, Intrusion Detection, Proxy, AntiVirus, Configuration Management, or Vulnerability Scanner, among others. For example, according to an embodiment, normalization of the index occurs using these primary factors: source type, asset identification, risk indicator properties (data bounds detected for properties based on the common information model), and risk index component contribution. Data source normalization can involve taking a source audit record (event in a log) and making a determination as to a type of source information for which this data matches the given pattern. After the pattern is identified to a given source type, the source type knowledge base is queried to determine the root source type for that data.

At step 930 of the method, one or more events are created from the normalized data. According to an embodiment, after normalization and categorization is complete, the data is transformed into a format that can be processed by the analytic engine, called an event. According to an embodiment, events produced by the source data normalization processed can be stored in an event database.

At step 940 of the method, analytics facts are computed from the event data.

According to an embodiment, using the normalized Event database created by the source data normalization process, entities called analytic facts are computed based on applying mathematical functions, pattern detection, anomaly detection, and rule-based assessment of the event data. Facts represent an assessment of Events, Facts, or a combination thereof. Examples of methods of deriving facts include, but are not limited to: (i) metrics in the form of: minimum; maximum; average; moving average; median; mode; and/or standard deviation; and (ii) mathematical functions in the form of: count; sum; trend, including increasing, decreasing, or same; rate (for example: time between events; rate of x per an object y; slope—rate of change over time); duration (for example: between events x and y, or event types a and b; time from detection of threat to containment or remediation of that threat data confidence—percent of errors in the data). Many other methods of deriving facts are possible. According to an embodiment, facts produced by the system can be stored in an Analytic Fact Database.

At step 950 of the method, one or more risk indicators are generated from the facts. According to an embodiment, risk indicators are computed from facts, including by applying global and/or time-series analysis of fact and event data in order to derive the indicator. Combining facts into risk indicators can make use of any function, including but not limited the examples set forth herein. Once risk indicators are calculated, they can be stored in an Analytic Fact Database for normalization processing.

At step 960 of the method, the one or more risk factors are normalized. According to an embodiment, the risk factors can be normalized by their associated data source type (sensor or detector), including additional normalizations such as the category of threat or vulnerability, logical/virtual location of the event, and physical or geographic location of the event, among many other options.

For example, in order to provide a cybersecurity risk index score that is comparable between two distinct sets of networked computing assets, such as departments within an organization or organizations of different sizes, normalizing the risk indicators is an important step in the index calculation process. The methods for normalization may be performed on variables that are shared across events and analytic facts, for example in the current embodiment they take the form of normalization by the sensor type that recorded the event, threat type, defense action type, vulnerability type, logical location (i.e., network assignment) or physical location.

At step 970 of the method, a risk index component score is calculated. According to an embodiment, a subset of Analytic Facts is retrieved per data source type and is then analyzed to produce various component scores. Risk indicators can be used to calculate the risk index component scores. Analytic facts for risk indicators that are normalized by sensor type are used to compute a set of risk index component scores, the set containing one set per sensor type that for which event data is available. The cyber risk index component score may include any of the factors described or otherwise envisioned herein.

At step 980 of the method, a cyber risk indicator index is calculated using the one or more cyber risk index component scores. According to an embodiment, to compute the cyber risk indicator index score, the values for all component risk scores for a choose time period of analysis are retrieved from the Analytic Fact database. Once retrieved, each component score is normalized relative to the number of points allocated to that component index per the system configuration. Subsequently, another operation to create the appropriate score distribution is applied via a configurable function for the score coefficient. Next, all of the scores are added and the sum is returned as the cyber risk indicator index score.

At step 990 of the method, the cyber risk indicator index is provided to a user. According to an embodiment, the cyber risk indicator index can be provided via a wired and/or wireless communications network. For example, the score may be communicated as a report, an email, a text message, a haptic indicator, a visual indicator, and/or an audible indicator, or any of a wide variety of other indications or communications. Alternatively or in addition to reporting the cyber risk indicator index score to a user, the system can be designed or configured to automatically process the cyber risk indicator index score in order to perform an Information Technology orchestration automation, implement an additional compliance rule, adapt the acceptable risk index score thresholds, or automatically produce alerts of risk rule violations via e-mail, text, or perform any other action as necessary. For example, according to an embodiment the system can take one or more preprogrammed preventative actions based on the score, such as inactivating a system or sub-system, blocking and/or inactivating a communications network, changing or deleting permissions, or any of a wide variety of other actions.

Figure 10:
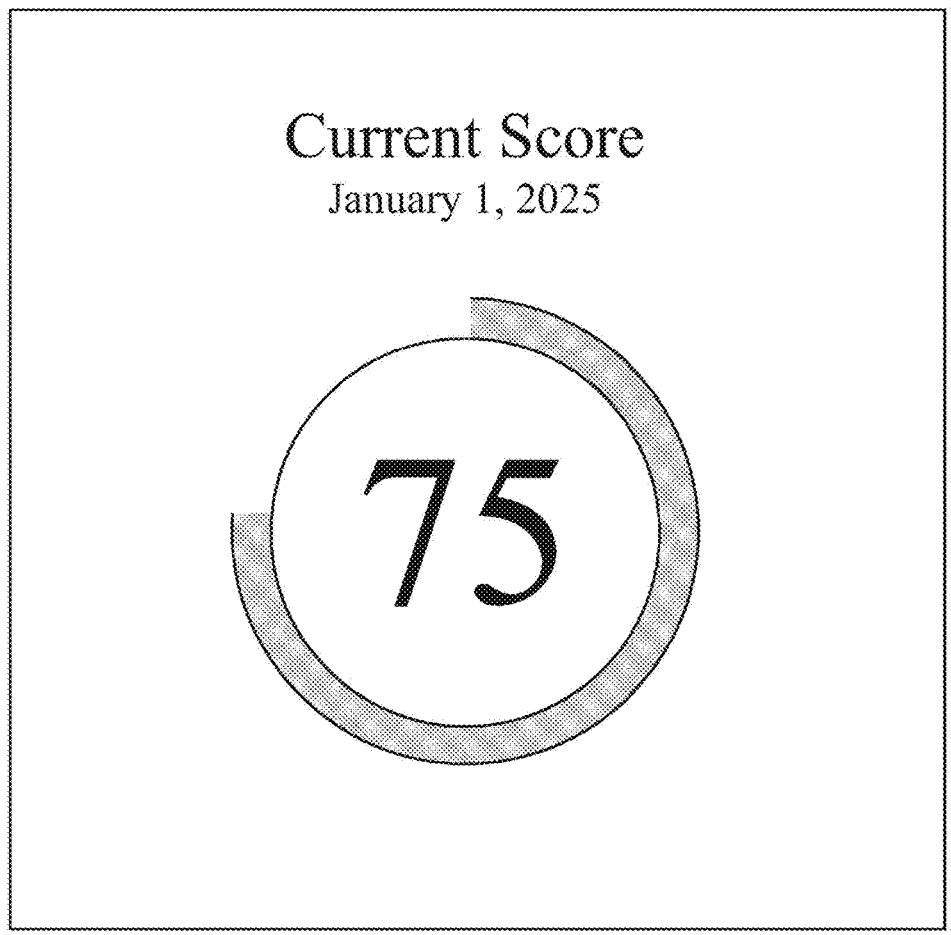
FIG. 10 is a schematic representation of a cyber risk index user interface, in accordance with an embodiment.
Figure 11:
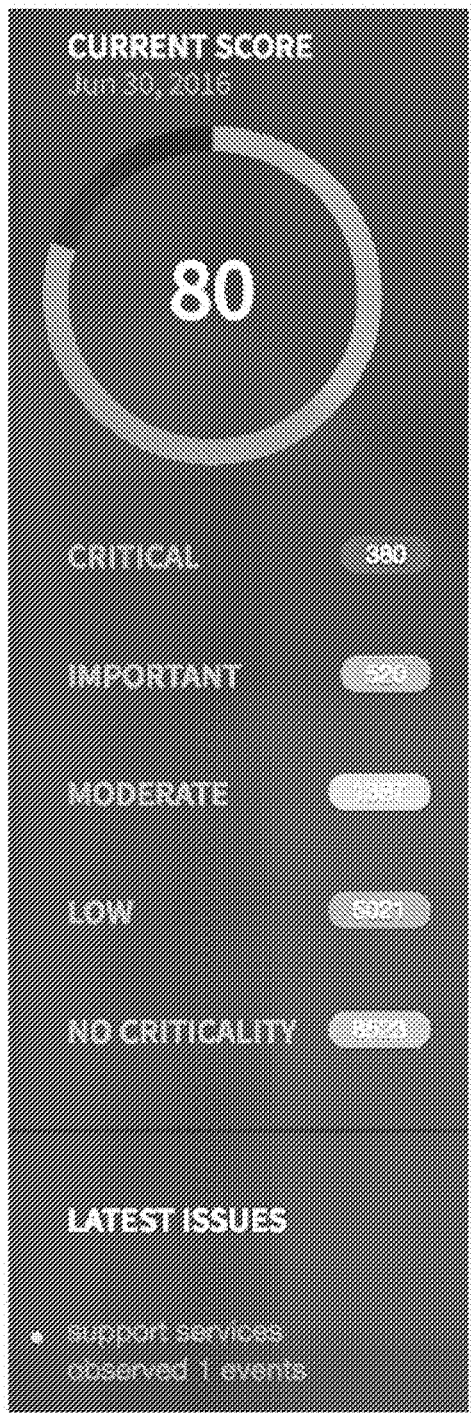
FIG. 11 is a schematic representation of a cyber risk index user interface, in accordance with an embodiment.
Figure 12:
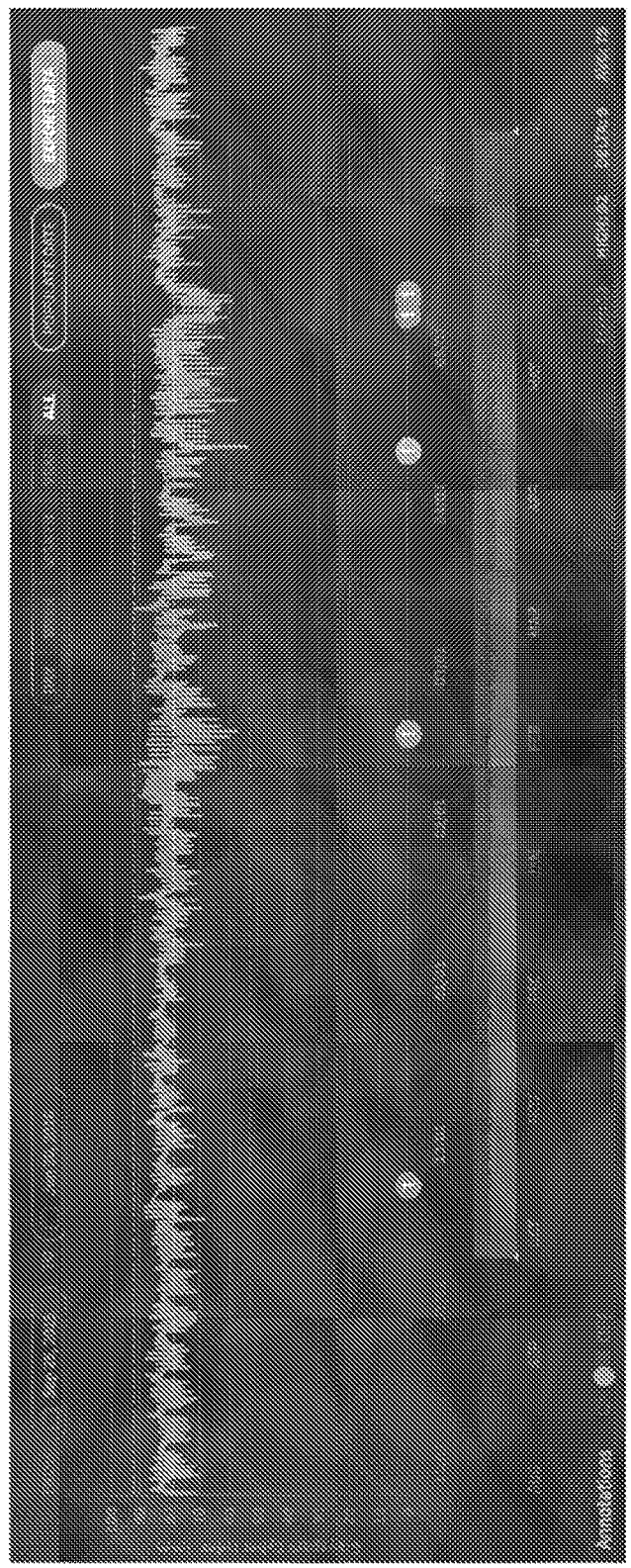
FIG. 12 is a schematic representation of a cyber risk index user interface, in accordance with an embodiment.

According to another embodiment, the cyber risk indicator index is provided via a user interface, such as a cyber risk dashboard. Referring to FIGS. 10-12, for example, are embodiments of one or more components of a cyber risk user interface or dashboard. In FIG. 10, for example, the calculated cyber risk index is calculated as a score between 0 and 100, inclusive. In FIG. 11, for example, the calculated cyber risk index is calculated as a score between 0 and 100, and events or risk factors are provided to the user depending on the severity of the risk (critical, important, moderate, low, and no criticality, for example). In FIG. 12, for example, the calculated cyber risk index is calculated as a score between 0 and 100 and is plotted on a graph over time. The user can then monitor changes in the calculated cyber risk index over time, and can extract or calculate patterns in the changing cyber risk index.

As another example, the score can be compared or normalized to a reporting mechanism such as a constant display or other user interface. When the score is below a predetermined threshold, the display reports the information, such as by displaying the color green. When the score exceeds a predetermined threshold, the display reports the information to the user, such as by displaying the color red. Many other display and/or notification systems and methods are possible.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for measuring a cyber security risk of an assessed system,
   receiving cyber security precursor information associated with the assessed system from a plurality of sensors;
   normalizing the received cyber security precursor information from each sensor based on a data source type identified for each sensor;
   generating a plurality of events based on the normalized cyber security precursor information;
   computing a plurality of facts based on the plurality of generated events, each fact corresponding to a metric or a mathematical function;
   calculating a plurality of risk indicators from the plurality of facts, each risk indicator calculated based on a function applied to a type of fact;
   normalizing a plurality of facts used to calculate each risk indicator of the plurality of risk indicators according to a data source type shared across events or analytic facts used to calculate each risk indicator;
   calculating a plurality of cyber risk index component scores for each data source type based on the plurality of normalized facts for each risk indicator;
   calculating-a cyber risk indicator index based on the plurality of cyber risk index component scores; and
   providing the cyber risk indicator index to a user, wherein the cyber risk indicator index measures the cyber security risk of the assessed system.

2. The method of claim 1, comprising:
   comparing the cyber risk indicator index to a pre-determined threshold.

3. The method of claim 2, wherein providing the cyber risk indicator index comprises:
   notifying the user of information that indicates whether the cyber risk indicator index exceeds the pre-determined threshold.

4. The method of claim 3, wherein notifying the user comprises providing a user interface configured to provide a haptic indicator, a visual indicator, or an audible indicator.

5. The method of claim 1, comprising:
   initiating an automated action in the assessed system based on the cyber risk indicator index to respond to the cyber security risk measured by the cyber risk indicator index.

6. The method of claim 5, wherein the automated action is initiated in response to determining that the cyber risk indicator index exceeds a pre-determined threshold.

7. The method of claim 5, wherein initiating the automated action comprises triggering a network policy.

8. The method of claim 7, wherein the network policy comprises configuring a firewall port restriction, a virtual firewall rule, or a network intrusion prevention system rule.

9. The method of claim 5, wherein initiating the automated action comprises inactivating a sub-system, inactivating a communications network, or blocking the communications network.

10. The method of claim 5, wherein initiating the automated action comprises changing or deleting permissions or adapting Identity and Access Management (IAM).

11. The method of claim 5, wherein initiating the automated action comprises:
producing an automated report that includes the cyber risk indicator index and depictions of causes of a change in the cyber risk indicator index.

12. The method of claim 1, wherein providing the cyber risk indicator index comprises:
providing a report that compares the calculated cyber risk indicator index with a previously calculated cyber risk indicator index.

13. The method of claim 1, wherein providing the cyber risk indicator index comprises:
for network segments in the assessed system, calculating respective cyber risk indicator indexes; and
providing an automated report that includes the calculated cyber risk indicator indexes.

14. The method of claim 1, wherein computing the plurality of facts comprises:
performing a mathematical analysis, pattern detection, anomaly detection, or rule-based assessment of the plurality of events.

15. The method of claim 1, wherein calculating the cyber risk indicator index comprises:
retrieving a plurality of cyber risk index component scores associated with a selected time period;
normalizing the plurality of retrieved cyber risk index component score, wherein each cyber risk index component score is normalized relative to a number of points allocated to that cyber risk index; and
calculating the cyber risk indicator index based on the plurality of normalized cyber risk index scores.

16. The method of claim 1, wherein normalizing the obtained cyber security precursor information from each sensor comprises:
weighting the cyber security precursor information from each sensor based on a percentage of network assets that are observed by each sensor and based on an operational impact of the observed network assets for each sensor.

17. A computerized system for measuring a cyber security risk of an assessed system, comprising:
one or more processors; and
a memory storing computerized-executable instructions that when executed by the one or more processors cause the one or more processors to:
receive cyber security precursor information associated with the assessed system from a plurality of sensors;
normalize the received cyber security precursor information from each sensor based on a data source type identified for each sensor;
generate a plurality of events based on the normalized cyber security precursor information;
compute a plurality of facts based on the plurality of generated events, each fact corresponding to a metric or a mathematical function;
calculate a plurality of risk indicators from the plurality of facts, each risk indicator calculated based on a function applied to a type of fact;
normalize a plurality of facts used to calculate each risk indicator of the plurality of risk indicators according to a data source type shared across events or analytic facts used to calculate each risk indicator;
calculate a plurality of cyber risk index component scores for each data source type based on the plurality of normalized facts for each risk indicator;
calculate a cyber risk indicator index based on the plurality of cyber risk index component scores; and
provide the cyber risk indicator index to a user, wherein the cyber risk indicator index measures the cyber security risk of the assessed system.

18. The computerized system of claim 17, wherein the one or more processors are caused to:
compare the cyber risk indicator index to a pre-determined threshold.

19. The computerized system of claim 18, wherein to provide the cyber risk indicator index, the one or more processors are caused to:
notify the user of information that indicates whether the cyber risk indicator index exceeds the pre-determined threshold.

20. The computerized system of claim 19, wherein to notify the user, the one or more processors are caused to:
provide a haptic indicator, a visual indicator, or an audible indicator via a user interface.

21. The computerized system of claim 17, wherein the one or more processors are caused to:
initiate an automated action in the assessed system based on the cyber risk indicator index to respond to the cyber security risk measured by the cyber risk indicator index.

22. The computerized system of claim 21, wherein the one or more processors are caused to initiate the automated action in response to determining that the cyber risk indicator index exceeds a pre-determined threshold.

23. The computerized system of claim 21, wherein to initiate the automated action, the one or more processors are caused to trigger a network policy.

24. The computerized system of claim 23, wherein the network policy comprises configuring a firewall port restriction, a virtual firewall rule, or a network intrusion prevention system rule.

25. The computerized system of claim 21, wherein initiating the automated action comprises inactivating a subsystem, inactivating a communications network, or blocking the communications network.

26. The computerized system of claim 21, wherein initiating the automated action comprises changing or deleting permissions or adapting Identity and Access Management (IAM).

27. The computerized system of claim 21, wherein initiating the automated action comprises:
producing an automated report that includes the cyber risk indicator index and depictions of causes of a change in the cyber risk indicator index.

28. The computerized system of claim 17, wherein to provide the cyber risk indicator index, the one or more processors are caused to:
provide a report that compares the calculated cyber risk indicator index with a previously calculated cyber risk indicator index.

29. The computerized system of claim 17, wherein to provide the cyber risk indicator index, the one or more processors are caused to:
for network segments in the assessed system, calculate respective cyber risk indicator indexes; and
provide an automated report that includes the calculated cyber risk indicator indexes.

30. The computerized system of claim 17, wherein to compute the plurality of facts, the one or more processors are caused to:
perform a mathematical analysis, pattern detection, anomaly detection, or rule-based assessment of the plurality of events.

31. The computerized system of claim 17, wherein to calculate the cyber risk indicator index, the one or more processors are caused to:
- retrieve a plurality of cyber risk index component scores associated with a selected time period;
- normalize the plurality of retrieved cyber risk index component score, wherein each cyber risk index component score is normalized relative to a number of points allocated to that cyber risk index; and
- calculate the cyber risk indicator index based on the plurality of normalized cyber risk index scores.

32. The computerized system of claim 17, wherein to normalize the obtained cyber security precursor information from each sensor, the one or more processors are caused to:
- weight the cyber security precursor information from each sensor based on a percentage of network assets that are observed by each sensor and based on an operational impact of the observed network assets for each sensor.

* * * * *